US009699649B2

(12) United States Patent
Shanmugam et al.

(10) Patent No.: US 9,699,649 B2
(45) Date of Patent: Jul. 4, 2017

(54) PROXIMITY-BASED VERIFICATION OF PROGRAMMING INSTRUCTIONS

(71) Applicant: Verizon Patent and Licensing Inc., Basking Ridge, NJ (US)

(72) Inventors: Sankar Shanmugam, Warren, NJ (US); Sudhin Vellooparambil Latheef, Warren, NJ (US); Michelle Felt, Warren, NJ (US); Petri Virkkula, Warren, NJ (US); Alan Lobo, Warren, NJ (US); Kedar Kotkunde, Warren, NJ (US); Thiru Voonna, Branchburg, NJ (US); Parthiv C Patel, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/742,824

(22) Filed: Jun. 18, 2015

(65) Prior Publication Data

US 2016/0373922 A1 Dec. 22, 2016

(51) Int. Cl.
*H04M 3/00* (2006.01)
*H04W 8/24* (2009.01)
*H04W 4/00* (2009.01)
*H04W 4/02* (2009.01)
*H04M 15/00* (2006.01)
*G06Q 30/00* (2012.01)
*H04W 84/12* (2009.01)

(52) U.S. Cl.
CPC ............ *H04W 8/24* (2013.01); *G06Q 30/016* (2013.01); *H04M 15/58* (2013.01); *H04W 4/008* (2013.01); *H04W 4/02* (2013.01); *H04W 84/12* (2013.01)

(58) Field of Classification Search
CPC ......... H04W 8/24; H04W 4/008; H04W 4/02; H04W 84/12; H04M 15/58; G06Q 30/016
USPC ....................................................... 455/418
See application file for complete search history.

(56) References Cited

U.S. PATENT DOCUMENTS

| 2008/0280588 | A1* | 11/2008 | Roundtree | G06F 9/45512 455/405 |
| 2009/0005071 | A1* | 1/2009 | Forstall | G06F 3/0481 455/456.1 |
| 2011/0034179 | A1* | 2/2011 | David | G01S 5/0236 455/456.1 |
| 2014/0150100 | A1* | 5/2014 | Gupta | G06F 21/316 726/22 |
| 2015/0206200 | A1* | 7/2015 | Edmondson | G06Q 30/0278 705/306 |

* cited by examiner

*Primary Examiner* — Amancio Gonzalez (57) ABSTRACT

A mobile device, such as a smart phone, receives program instructions, such as program instructions to evaluate components and/or software in the mobile device. The mobile device detects a local network and determines whether an attribute of the local network matches a desired attribute, such as a service set identifier (SSID) identified in the program instructions. When the attribute of the local network matches the desired attribute, the mobile device executes the program instructions. If the attribute of the local network does not match the desired attribute, the mobile device continues to look for a matching local network before executing the program instructions.

20 Claims, 7 Drawing Sheets

PROXIMITY-BASED VERIFICATION OF PROGRAMMING INSTRUCTIONS

BACKGROUND INFORMATION

A mobiles device, such as a smart phone, may access wireless networks to receive data communication services for voice calls, mobile messaging services (e.g. text and/or multimedia), and data communications. The data communication services include, for example, accessing the Internet via a browser and/or accessing multimedia content via a media player.

As technology has evolved, the features and functionalities provided by mobile devices have increased in number and complexity. Unfortunately, the same technological evolution has also resulted in increases in variety and complexity of troubles or issues related to the mobile devices. When a technical issue arises in a mobile device, the user may request technical assistance from a service representative at a retail store, and the service representative may need to diagnosis the potentially complicated technical issue. For example, the service representative may need to quickly and accurately assess the value of a mobile device being returned by a user (e.g., if the user is exchanging the mobile device for another, newer mobile device) such that the value reflects any technical issues in the mobile device.

DETAILED DESCRIPTION OF PREFERRED EMBODIMENTS

The following detailed description refers to the accompanying drawings. The same reference numbers in different drawings identify the same or similar elements.

In certain implementations, a mobile device, such as a smart phone, receives program instructions to evaluate components in the mobile device. The mobile device detects a local network and determines whether the local network has a desired attribute, such as a particular service set identifier (SSID) provided in the program instructions. If the local network has the desired attribute, the mobile device executes the program instructions. If the local network does not possess the desired attribute, the mobile device continues to look for a local network that has the desired attribute before executing the program instructions.

Figure 1:
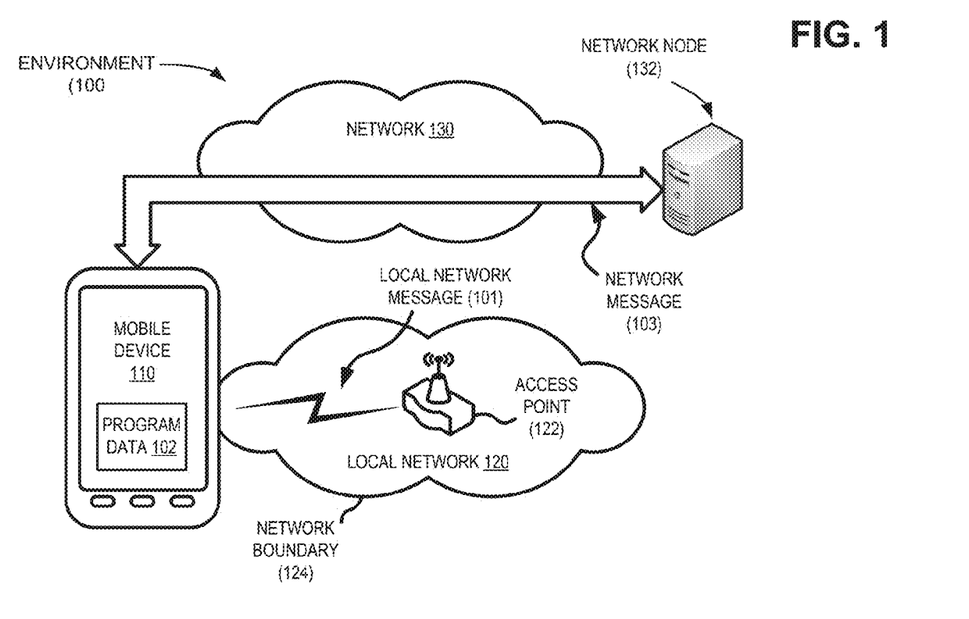
FIG. 1 is a diagram illustrating aspects of an exemplary environment according to implementations described herein.

FIG. 1 is a diagram showing an exemplary environment 100 in which the systems and/or methods described herein may be implemented. As shown in FIG. 1, environment 100 may include a mobile device 110 that receives a local network message 101 transmitted via a local network 120 by an access point 122. Mobile device 110 may selectively execute program data 102 based on an attribute of local network message 101. Mobile device 110 may receive program data 102 via local network 120 (e.g., through in local network message 101) or, as further shown in FIG. 1, mobile device 110 may receive program data 102 in a network message 103, over a different network 130, from a network node 132.

In certain implementations described herein, mobile device 110 may refer to a device that is capable of selectively executing program data 102 if mobile device 110 is geographically positioned at a particular location identified in or otherwise associated with program data 102. In one implementation, mobile device 110 may include a portable communication device such as a smart phone. In other implementations, mobile device 110 may include a phablet device, a global positioning system (GPS) device, and/or another type of wireless device; a laptop, tablet, or another type of portable computer; a media playing device; a portable gaming system; and/or any other type of mobile computer device with communication capabilities.

As used herein, program data 102 may includes a program, module, subroutine, method, function, script, etc., that can be executed by a processor. In certain situations, program data 102 may relate to evaluating one or more hardware/software components included in mobile device 110 or an associated device (e.g., a device coupled to or otherwise being scanned by mobile device 110). For example, a vendor may cause mobile device 110 to execute program data 102 to verify that mobile device 110 is free of defects when mobile device 110 is received by the vendor. In another example, mobile device 110 may execute a device diagnostic program associated with program data 102 when mobile device 110 is located at and/or within a threshold distance of a retail store. In another example, mobile device 110 may execute a device diagnosis program associated with program data 102 when mobile device 110 is located at a service facility. In yet another example, a remote customer service representative may cause mobile device 110 to execute the device diagnostic program based on a location of mobile device 110. For example, the customer service representative may identify a particular location (e.g., a network location through which the customer service representative is communicating with mobile device 110) associated with mobile device 110 and may update program data 102 to cause its execution based on the presence of mobile device in the particular location.

Mobile device 110 and access point 122 may communicate over short distances (e.g., within a few meters) over a wireless network, such as local network 120. Devices may communicate over a wireless network corresponding to local network 120 using, for example, radio signals (e.g., Bluetooth® or Wi-Fi®) and/or infrared signals (e.g., Infrared Data Association, or IrDA). In a wireless network, mobile device 110 and access point 122 may pair (e.g., establish a wireless connection) to exchange data when brought in proximity of one another.

Local network 120 may correspond to a personal area network ("PAN"), a wireless local area network (WLAN) based on the International Electrical and Electronics Engineers 802.11 protocol (e.g., Wi-Fi®), or other short-range network via which mobile device 110 may communicate with access point 122. For example, mobile device 110 and access point 122 may communicate via Bluetooth®, Wi-Fi®, and/or another wireless network. In another example, mobile device 110 and access point 122 may communicate via a near field communication ("NFC") or an infrared-based communications such as Infrared Data Association (IrDA) protocols.

Additionally or alternatively, mobile device 110 may communicate with access point 122 via one or more wired connections. For instance, mobile device 110 and access point 122 may communicate via a universal serial bus (USB) cable, a Lightning® cable, a High Definition Multimedia Interface ("HDMI") cable, or another type of wired connection. In some implementations, local network 120 may include an "ad-hoc" network, and in some implementations, local network 120 may include one or more routers, hubs, and/or switches (e.g., access point 122). In some implementations, local network 120 may include a portion of a wide area network ("WAN").

Access point 122 may include any hardware or software, such as an 802.11a, b or g router, a wireless access point, a wireless adapter, a base station, etc., that acts as a communication hub for connecting mobile device 110 to local network 120. In another example, access point 122 may correspond to an LTE eNodeB base station, a Global System for Mobile Communications (GSM) base station, a Code Division Multiple Access (CDMA) base station, and/or another type of base station. In this example, local network 120 may correspond to a portion (e.g., a cell) of an LTE, GSM, or CDMA data network.

In one situation, mobile device 110 may include hardware, software, or a combination thereof to detect its geographic location. For example, mobile device 110 may use global positioning system (GPS) technology to determine the geographic location of mobile device 110. Other suitable location detection technologies also may be used in other examples, such as trilateration techniques to process radio frequency (RF) signals received by mobile device 110 (e.g., from network 130) and to estimate a geographic location based on processing the RF signals. In another example, mobile device 110 may analyze environmental conditions, such as temperature, air pressure, humidity, moisture levels, noise levels, altitude, ambient light levels, etc. and may identify a geographic location. In yet another example, mobile device 110 may determine its location by capturing image data and processing the image data to identify a location based on a distinctive geographic feature, such as a building, landmark, text, etc.

In one embodiment, mobile device 110 may determine its geographic location based on contents of local network message 101 received via local network 120 (e.g., from access point 122). Access point 122 may transmit local network message 101 within a limited region (e.g., within a network boundary 124 that may correspond to the range of local network message 101). Mobile device 110 may determine that it is located within network boundary 124 when mobile device 110 detects local network message 101. Local network message 101 may carry information that enables mobile device 110 to identify local network 120 and/or access point 122.

For example, local network message 101 may include or identify a service set identifier (SSID) associated with local network 120 when local network 120 operates as a wireless local area network (WLAN), e.g., based on one of the IEEE 802.11 standards, such as Wi-Fi®. Typically, an SSID is a sequence of 32 or more alphanumeric characters. The SSID may be defined by a network administrator to identify the WLAN. Devices within a WLAN (e.g., within local network 120), such as mobile device 110 and access point 122, use the SSID to exchange data and communicate. For example, a communications transmitted within local network 120 may be tagged with the SSID so that the communications may be identified by devices in local network 120.

When access point 122 provides access to local network 120 via Bluetooth®, local network message 101 may correspond to a Bluetooth® connection request and may include, for example, data identifying a class of device (CoD) (data identifying a device class or type associated with access point 122), a list of services offered by access point 122, and/or other information identifying features associated with access point 122, an associated manufacturer, communications protocols that are accepted by access point 122, a clock offset used by access point 122, etc.

Additionally or alternatively, local network message 101 may include or identify other information associated with local network 120, such as a network name, a transmission frequency, a transmission protocol, an address of access point 122 or other node in local network 120, information identifying a brand/model associated with access point 122, etc. Local network message 101 may further include or identify other information that may be used by mobile device 110 to access local network 120, such as a Wi-Fi protected access (WPA) code or a Wi-Fi protected access II (WPA2) code, under IEEE 802.11i, that is used by mobile device 110 to exchange data with access point 122. In another example, local network message 101 may include information identifying or otherwise associated with access point 122. For example, local network message 101 may include a mobile directory number (MDN) or other telephone number, a media access control (MAC) address, an internet protocol (IP) address, a mobile equipment identifier (MEID), etc. identifying access point 122. In another implementation, local network 120 may correspond to a cell of a LTE or other communications network, and local network message 101 may include a cell identifier.

Mobile device 110 may use information included in local network message 101 (e.g., an SSID for local network 120) to verify that local network message 101 is received from access point 122 associated with local network 120 and not from another network.

In certain implementations, mobile device 110 may determine a characteristic of local network message 101 and may use this characteristic to determine its location. For example, mobile device 110 may measure a characteristic associated with local network message 101 and may use this characteristic to estimate a distance/direction to access point 122. For example, mobile device 110 may identify a frequency change, a transmission delay, and/or a received portion of local network message 101. In another example, mobile device 110 may measure a received signal strength of local network message 101. For example, mobile device 110 may determine a received signal strength indicator (RSSI) value and/or a received channel power indicator (RCPI) value, as defined in IEEE standard 802.11 for wireless local area networks (WLANs). Mobile device 110 may provide an indication of a direction toward access point 122 (e.g., back to an area associated with local network 120) if mobile device 110 crosses network boundary 124. Mobile device 110 may use the measured attribute of local network message 101 to determine if mobile device 110 is approaching network boundary 124. For example, mobile device 110 may determine that it is moving toward access point 122 if the measured signal strength is increasing, and that it is moving away from access point 122 if the measured signal strength is decreasing. Mobile device 110 may further determine that is has entered local network 120 (e.g., crossed network boundary 124) when the signal strength exceeds a threshold value.

A distance between mobile device 110 and access point 122 may be determined using Equation 1:

$$L = 20 \log_{10}(40\pi d/\lambda) \quad \text{(Eq. 1).}$$

In Equation 1, L corresponds to the signal strength loss in decibels, d corresponds to the distance between mobile device 110 and access point 152, and λ corresponds to the wavelength of local network message 101.

In one implementation, program data 102 may include instructions that cause mobile device 110 to execute a portion of program data 102 when mobile device 110 is positioned at a particular geographic location and/or if mobile device 110 receives local network message 101 from a particular local network 120. For example, mobile device 110 may use data provided by local network message 101 (e.g., the SSID) to determine that mobile device 110 is located at a geographical position associated with a particular local network 120. For example, mobile device 110 may receive, as local network message 101, a connection request or other message from access point 122 via local network 120. Mobile device 110 may determine whether an SSID or other attributes associated with local network message 101 correspond to an attribute that triggers the execution of program data 102. For example, mobile device 110 may execute program data 102 if a measured signal strength of local network message 101 exceeds a threshold value associated with passing through network boundary 124.

Access point 122 may define local network 120 within a specific geographic area referred to as a "hotspot." If mobile device 110 is located within the hotspot, mobile device 110 and access point 122 may exchange data using the SSID (if local network 120 supports Wi-Fi®) or using other data (if local network 120 supports Bluetooth®, IrDA, or other types of communications). For example, access point 122 may communicate with mobile device 110 to provide program data 102, receive data associated with execution of program data 102, provide performance results, etc.

In one implementation, program data 102 may include, for example, instructions that, when executed by mobile device 110, cause it to perform operations to evaluate and/or guide a user to evaluate one or more functions, features, components, etc. Program data 102 may further includes instructions that cause mobile device 110 to report any identified issues, provide technical assistance to a user, identify appropriate personnel for providing assistance, and/or to establish communications between the user and the identified assistance personnel.

In one implementation, access point 122 may be associated with local network 120 and another, separate network. For example, access point 122 may be associated with both a Bluetooth®-based local network 120 and a wireless wide area network (WWAN), such as long term evolution (LTE), 4G, or 3G network. In this example, local network message 101 may include or identify information associated with both the Bluetooth network and the WWAN network. For example, local network message 101 may include information identifying a first MAC address (e.g., 48 bit address based on a MAC-48 protocol) for Bluetooth® communications and a second, different MAC address (e.g., an extended unique identifier, or EUI, 48 bit or 64 bit address) for exchanging data via the WWAN.

Mobile device 110 may receive program data 102 from access point 122. For example, access point 122 may forward program data 102 over local network message 101. In one instance, access point 122 may forward, over local network message 101, program data 102 when mobile device 110 first enters local network 120. Mobile device 110 may execute instructions within program data 102 when mobile device 110 subsequently reenters local network 120 (e.g., when mobile device 110 detects one or more attributes of local network 120 and/or program data 102.

In another example, mobile device 110 may receive program data 102 via a network 130 that differs from the local network 120. For example, network 130 may include a local area network (LAN), a wireless LAN (WLAN) (e.g., an 802.11 network) that differs from local network 120, a wide area network (WAN) (e.g., the Internet), a wireless WAN (WWAN) (e.g., a 3GPP System Architecture Evolution (SAE) Long-Term Evolution (LTE) network, a Global System for Mobile Communications (GSM) network, a Universal Mobile Telecommunications System (UMTS) network, a Code Division Multiple Access 2000 (CDMA2000) network, a High-Speed Packet Access (HSPA) network, and/or a Worldwide Interoperability for Microwave Access (WiMAX) network, etc.). Additionally, or alternatively, network 130 may include a fiber optic network, a metropolitan area network (MAN), an ad hoc network, a virtual network (e.g., a virtual private network (VPN)), a telephone network (e.g., a Public Switched Telephone Network (PSTN)), a cellular network, a Voice over IP (VoIP) network, or another type of network.

Network 130 may include one or more network nodes 132, such as router, content server, application server, message server, switch, etc. that forward program data 102 via a network message 103. For example, if network message 103 corresponds to an SMS message carrying program data 102, network node 132 may correspond to a SMS messaging. In another example, mobile device 110 may receive a first portion of program data 102 via local network 120 or via another network, and network node 132 may provide a second portion of program data 102 to mobile device 110. For example, mobile device 110 may receive information identifying local network 120 from network node 132, and mobile device 110 may use this information to obtain instructions from access point 122 (e.g., via local network message 101).

In one example, network node 132 may authenticate mobile device 110. If the authentication fails, network node 132 may block transmission of local network message 101 to mobile device 110. For example, network node 132 may forward instructions to access point 122 that cause access point 122 to cease emitting local network message 101 when mobile device 110 fails authentication. Additionally or alternatively, network node 132 may forward instructions that cause access point 122 to modify a feature and/or an attribute of local network message 101. For example, network node 132 may modify the SSID associated with local network 120. Additionally or alternatively, network node 132 may cause access point 122 to emit local network message 101 at a particular power level, frequency, or other transmission attribute.

In another implementation, network node 132 may receive, from mobile device 110, results from the execution of program data 102. For example, if program data 102 relates to scanning mobile device 110 for faults, network node 132 may provide a device profile, associated with mobile device 110, that may be used by mobile device 110 to perform the scan. For example, the device profile may identify components and/or software installed in mobile device 110, and mobile device 110 may execute program data 102 to scan the identified components and/or software. Mobile device 110 may further forward results of the scanning to network node 132. Network node 132 may evaluate the results and provide assistance to a user of mobile device 110. For example, network node 132 may instruct the user to address the fault, schedule a service visit, identify a replacement component, provide a trade-in value, etc.

Although FIG. 1 shows exemplary components of environment 100, in other implementations, environment 100 may include fewer components, different components, differently arranged components, or additional components than those depicted in FIG. 1. For example, local network 120 may include multiple access points 122, and mobile device 110 may receive local network message 101 from a closest one of the access points 122. Additionally or alternatively, one or more components of environment 100 may perform functions described as being performed by one or more other components of environment 100.

Figure 2:
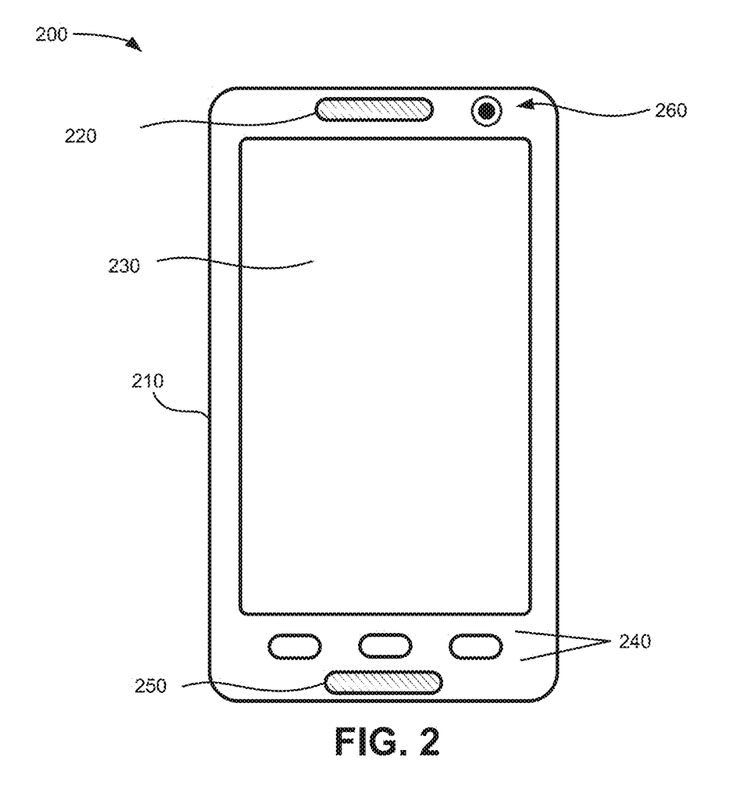
FIG. 2 is a diagram illustrating exemplary components of a mobile device that may be included in the environment of FIG. 1.

FIG. 2 shows an exemplary communications device 200 that may correspond to mobile device 110. As shown in FIG. 2, communications device 200 may include a housing 210, a speaker 220, a display screen 230, control buttons 240, a microphone 250, and/or camera element 260. Housing 210 may include a chassis via which some or all of the components of communications device 200 are mechanically secured and/or covered. Speaker 220 may include a component to receive input signals from communications device 200 and transmit audio output signals, which communicate audible information to a user of communications device 200.

Display screen 230 may include a component to receive input signals and present a visual output in the form of text, images, videos and/or combinations of text, images, and/or videos. In one implementation, display screen 230 may selectively present a portion of program data 102 and/or present a user interface to receive program data 102. In one implementation, display screen 230 may display text that is input into communications device 200, text, images, and/or video received from another device, and/or information regarding incoming or outgoing calls or text messages, emails, media, games, phone books, address books, the current time, etc. In one implementation, display screen 230 may correspond to a touch screen that includes a component to detect an input. For example, display screen 230 may include a pressure sensor and to detect touch for inputting content to touch screen 230. Alternatively or additionally, display screen 230 may include a capacitive or field sensor to detect a touch or proximity of the user or an input device to display screen 230.

Control buttons 240 may include one or more buttons that accept or otherwise detect an input from the user (e.g., the user presses a control button or combinations of control buttons) and send electrical signals to a processor (not shown) that may cause communications device 200 to perform one or more operations. For example, control buttons 240 may be used to cause communications device 200 to perform operations related to diagnosing a fault in communications device 200.

Microphone 250 may include a component to receive audible information from a user and send, as output, a signal transmitted to another user device, or cause the device to perform one or more operations. In one implementation, microphone 250 may capture audio data from an associated user, and communications device 200 may convert the audio data (e.g., by performing a speech-to-text conversion) into a portion of program data 102.

Camera element 260 may be provided on a front or back side of communications device 200, and may include a component to receive, as input, optical signals and send, as output, a digital image or video that can be, for example, viewed on touch screen 230, stored in the memory of communications device 200, discarded and/or transmitted to another communications device 200. In one implementation, camera element 260 may capture image data, and communication device 200 may identify its location based on the captured image data.

Figure 3:
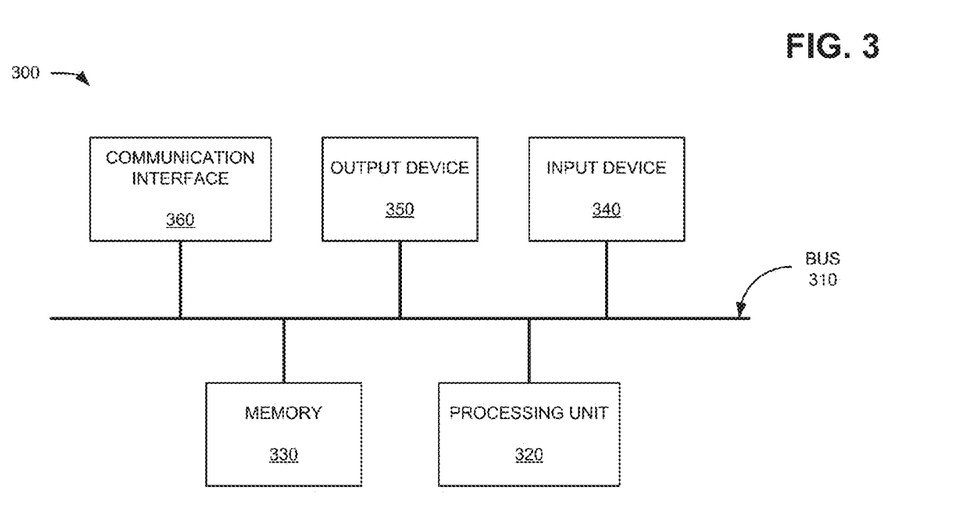
FIG. 3 is a diagram illustrating exemplary components of a computing device that may be included in the environment of FIG. 1.

FIG. 3 is a diagram illustrating exemplary functional components of a computing device 300 according to an implementation described herein. Mobile device 110, access point 122, and/or network node 132 may each include one or more devices 300. As shown in FIG. 3, device 300 may include a bus 310, a processing unit 320, a memory 330, an input unit 340, an output unit 350, and a communication interface 360.

Bus 310 may include a path that permits communication among the components of device 300. Processing unit 320 may include any type of single-core processor, multi-core processor, microprocessor, latch-based processor, and/or processing logic (or families of processors, microprocessors, and/or processing logics) that interprets and executes instructions. In other embodiments, processing unit 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processing unit 320, and/or any type of non-volatile storage device that may store information for use by processing unit 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input unit 340 may allow an operator to input information into device 300. Input unit 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input unit 340. In other words, device 300 may be "headless" and may not include a keyboard, for example.

Output unit 350 may output information to an operator of device 300. Output unit 350 may include a display, a printer, a speaker, and/or another type of output device. For example, device 300 may include a display, which may include a liquid-crystal display (LCD) for displaying content to the customer. In some embodiments, device 300 may be managed remotely and may not include output unit 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals.

Communication interface 360 may include and/or may be coupled to an antenna for transmitting and receiving RF signals. For example, communication interface 360 may be coupled to an antenna assembly that includes one or more antennas to transmit and/or receive RF signals. The antenna assembly may, for example, receive data from communication interface 360 and transmit RF signals associated with the data (e.g., program data 102 and/or local network message 101), or the antenna assembly may receive RF signals (e.g., local network message 101) and provide them to communication interface 360 to be processed.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a Wi-Fi) card for wireless communications. Communication interface 360 may also include a universal serial bus (USB) port for communications over a cable, a Bluetooth® wireless interface, a radio-frequency identification (RFID) interface, a near-field communications (NFC) wireless interface, and/or any other type of interface that converts data from one form to another form.

As will be described in detail below, device 300 may perform certain operations, and device 300 may perform these operations in response to processing unit 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processing unit 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than those depicted in FIG. 3. Additionally or alternatively, one or more components of device 300 may perform one or more tasks described as being performed by one or more other components of device 300.

Figure 4:
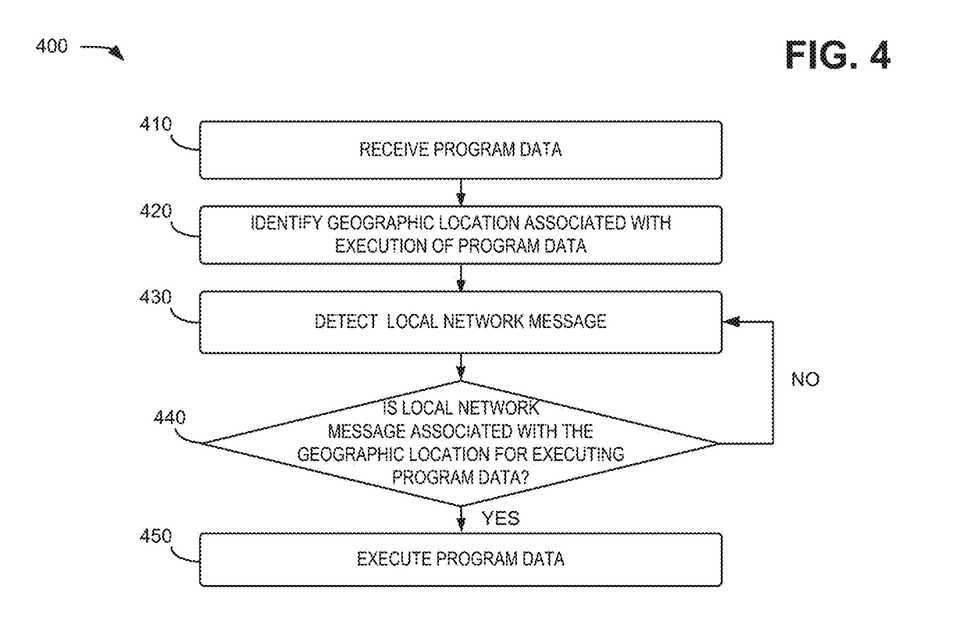
FIG. 4 is a flowchart of a process for selectively executing program data based on a location of a mobile device in the environment of FIG. 1.

FIG. 4 is a flowchart of a process 400 for executing program data 102 when mobile device 110 is at a designated geographic location. In some implementations, process 400 may be performed by mobile device 110. In other implementations, some or all of process 400 may be performed by another device or a group of devices separate from and/or including mobile device 110.

As shown in FIG. 4, process 400 may include receiving program data 102 (block 410). For example, as described above with respect to FIG. 1, mobile device 110 may obtain program data 102 from access point 122 via local network 120 and/or from network node 132 via network 130. Additionally or alternatively, mobile device 110 may receive an SMS or other message providing data that enables mobile device 110 to access program data 102. For example, the message may identify a device, storage location, web page, IP address, domain, etc. where program data 102 is stored and/or information (e.g., a pass code) that can be used by mobile device 110 to access the stored program data 102. In another example, mobile device 110 may receive program data 102 or related information from mobile device 110 via a communication connection (e.g., Bluetooth®) or via a physical connection such as a USB cable.

In other examples, mobile device 110 may obtain program data 102 from another source. For example, program data 102 may be installed on mobile device 110 when mobile device 110 is built or when mobile device 110 is sold to a user. In another example, program data 102 may be stored on a memory, such as memory card or memory device, that may be accessed by mobile device 110 when the memory is installed or otherwise coupled to the mobile device 110.

In another implementation, receiving program data 102 in process block 410 may include mobile device 110 providing a graphical user interface (GUI) or another interface that enables a user to manually enter and/or modify program data 102. Similarly, an interface may be provided on another device associated with the user (e.g., a computing device, another mobile device 110, etc.) and data entered by the user on the other device may be forwarded to mobile device 110 as program data 102.

In another implementation, mobile device 110 may receive program data 102 from access point 122 only when mobile device 110 is in proximity of access point 122. For example, access point 122 may provide program data 102 to mobile device 110 when mobile device 110 is located at a particular location (e.g., a retail location from which the mobile device 110 is obtained). In another example, access point 122 may provide program data 102 to mobile device 110 via a first short-range signal or connection, such as a short-range wireless link like Bluetooth®, via Wi-Fi® (e.g., via local network 120), or via a physical cable, and mobile device 110 may execute program data 102 when access point 122 and mobile device 110 communicate via a second, different short-range signal or connection. Alternatively, mobile device 110 may receive information (e.g., a storage location) from access point 122 that may be used to acquire program data 102.

As shown in FIG. 4, process 400 may further include identifying a geographic location associated with execution of the program data 102 (block 420). For example, mobile device 110 may parse the program data 102 to identify a location or group of locations where program data 102 should be executed. For example, program data 102 may include information identifying and/or that may be used by mobile device 110 to obtain an address and/or coordinates (e.g., a longitude/latitude pair of values) that are associated with one or more geographic locations. If program data 102 includes information identifying the names or other descriptors of one or more geographic locations, mobile device 110 may use this information to identify coordinates of the geographic locations and/or to identify one or more local networks 120 positioned at the geographic locations. For example, mobile device 110 may use information in program data 102 to form a search query for searching documents (e.g., accessing a search engine or knowledge base) to identify information relevant to the execution locations. For example, if program data 102 identifies a specific geographic location or group of locations, mobile device 110 may determine a local network 120 serving the specific geographic location or group of locations.

In one implementation, the location for execution of program data 102 may correspond to a current (e.g., most recently determined) location of mobile device 110. For example, an operator may determine a SSID associated with a local network 120 close to the mobile device 110 (e.g., through which mobile device 110 is communicating) and may update program data 102 to cause its execution (e.g., based on the presence of mobile device 110 in its current location).

In another example, program data 102 may include data identifying a characteristic of a location, and such as the name or type of a store, and mobile device 110 may use this information identify specific locations for executing program data 102. For example, program data 102 may indicate that mobile device 110 should execute program data 102 at a location associated with a vendor, service provider, and/or repair facility. For example, mobile device 110 may search geographic locations matching the location criteria.

In another implementation, program data 102 may identify a local network 120 associated with the geographic location. For example, program data 102 may include a SSID, network name, WPA value, cell identifier, communication protocol, IP address associated with access point 122, serial number/MDN of access point 122, etc. In another example, program data 102 may identify some information (e.g., a network name) associated with local network 120, and may identify other network characteristics (e.g., an SSID) that may be used by mobile device 110 to determine its proximity to local network 120.

In another implementation, program data 102 may include information identifying a characteristic of an SSID or other network identifier (if local network 120 is a Wi-Fi® or similar network) or a connection request (if local network 120 provides a Bluetooth® or another similar connection). For example, program data 102 may include information identifying a portion (e.g., an alphanumeric string) included in one or more SSIDs. Additionally or alternatively, program data 102 may include information identifying a characteristic of one or more SSIDs associated with local network 120. For example, program data 102 may identify a length, format, initial and/or last character, or other characteristic associated with the SSID.

Additionally or alternatively, program data 102 may include information identifying a mathematical characteristic associated with an SSID for local network 120. For example, program data 102 may identify a modulo function value associated with a SSID for a local network 120. Computing the modulo function value may include dividing a numerical portion of the SSID (i.e., the "dividend") by a particular number (i.e., the "divisor") and identifying, as the modulo function value, a remainder value. For example, an operator may program access points 122 in one or more locations to use one or more SSIDs that, when divided by a number specified in program data 102, result in a particular modulo function value. When the particular modulo function value is detected, mobile device 110 may implement program data 102. In this way, an operate may cause mobile device 110 to implement program data 102 at different locations but still control activation of program data 102 by mobile device 110.

In yet another implementation, program data 102 may include information identifying a characteristic of a local network message 101, such as a frequency or range of frequencies at which, an encoding scheme, contents (e.g., a header or payload values) of data carried in local network message 101, a time value, etc.

Continuing with FIG. 4, process 400 may further include detecting local network message 101 (block 430) and determining whether local network message 101 is associated with a geographic region for executing program data 102 (block 440). For example, mobile device 110 may receive, as local network message 101, a connection request to join or otherwise exchange data via local network 120, and mobile device 110 may parse the connection request to identify local network 120. In one implementation, detecting local network message 101 in process block 430 may include causing mobile device 110 to detect, via an antenna array and/or transceiver at certain time intervals and/or at certain locations, local network message 101.

Mobile device 110 may determine an identifier (e.g., the SSID) of local network 120 or an identifier of access point 122 (e.g., class of device data) from local network message 101, and mobile device 110 may determine whether the identified local network 120 and/or access point 122 is associated with the geographic location for executing program data 102. For example, mobile device 110 may determine whether local network 120 and/or access point 122 are identified in program data 102. Additionally or alternatively, mobile device 110 may identify a characteristic of local network message 101 and may compare this characteristic to signals exchanged in a desired local network 120. Also, mobile device 110 may determine a geographic location associated with local network 120 and/or access point 122, and mobile device 110 may determine whether to execute program data 102 at the identified location.

In another example, mobile device 110 may determine a geographic location based on other factors that are unrelated to local network message 101, such as GPS signals, and mobile device 110 may determine whether to execute program data 102 at the identified location. In yet another example, mobile device 110 may determine whether to execute program data 102 based on multiple factors. For example, mobile device 110 may determine to execute program data 102 when (i) it is positioned at a particular geographic location (e.g., as determined based on GPS signal or other location technique), and (ii) when mobile device 110 receives local network message 101 associated with a particular local network 120 and/or access point 122.

In one implementation, mobile device 110 may further evaluate one or more attributes of local network message 101 to determine whether mobile device 110 is moving toward access point 122. For example, mobile device 110 may determine that mobile device 110 is moving toward access point 122 when a signal strength of local network message 101 is increasing.

If mobile device 110 determines that the detected network signal is associated with a geographic location for executing program data 102 (block 440: "Yes"), mobile device 110 may execute program data 102 (block 450). In one implementation, mobile device 110 may determine whether mobile device 110 is moving toward access point 122, and may execute program data 102 in process block 450 when mobile device 110 is at a particular location associated with local network 120 and is moving toward access point 122.

Otherwise, if mobile device 110 determines that the detected network signal is not associated with the geographic location for executing program data 102 (block 440: "No"), mobile device 110 may return to block 430 and continue to scan for local network message 101. Additionally or alternatively, mobile device 110 may execute program data 102 when an input (e.g., a particular series of alphanumeric characters) is received from a user and received from another device (e.g., from a customer service representative).

Figure 5:
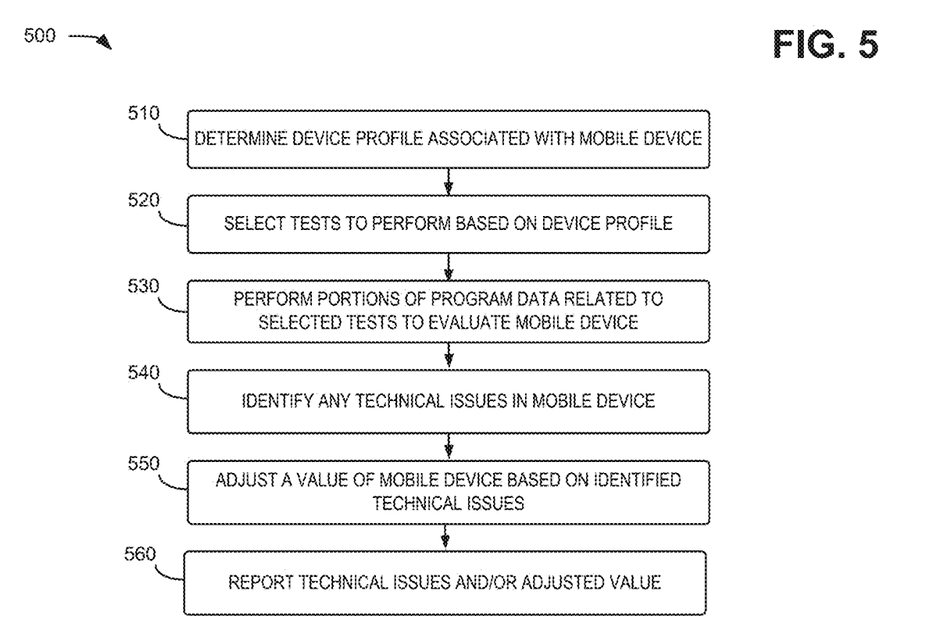
FIG. 5 is a flowchart of a process for executing program data to determine a status of a mobile device in the environment of FIG. 1.

FIG. 5 is a flowchart of a process 500 for executing program data 102 related to evaluating mobile device 110. In some implementations, process 500 may be performed by mobile device 110. In other implementations, some or all of process 500 may be performed by another device or a group of devices (e.g., other devices that are not shown in FIG. 1) separate from and/or including mobile device 110.

As shown in FIG. 5, process 500 may include determining a device profile associated with scanning mobile device 110 (block 510). For example, a device profile may be selected based on one or more attributes of mobile device 110, such as its manufacturer, service provider, model number, device type, location, user attributes, prior activities, components, etc. For example, the device profile may identify hardware and/or software operating on mobile device 110. One or more tests to perform when scanning mobile device 110 may be selected based on the device profile (block 520). For example, the selected tests may relate to evaluating components included in mobile device 110, and may be further selected to be compatible with the software operating on mobile device 110. For example, if mobile device 110 corresponds to the exemplary communications device 200 depicted in FIG. 2, the selected tests may evaluate, among other components, speaker 220, display screen 230, control buttons 240, microphone 250, and/or camera element 260. In this example, portions of program data 102 related to testing components that are not present in communications device (e.g., a key pad), would not be performed.

As shown in FIG. 5, process 500 may include executing portions of program data 102 associated with the selected tests to evaluate mobile device 110 (block 530) and identifying any technical issues in mobile device 110 based on executing the portions of program data 102 associated with the selected tests (block 540). For example, program data 102, when executed, may perform various functions related to evaluating components of mobile device 110 and/or guiding a user through actions related to evaluating components of mobile device 110. For example, program data 102 may be executed to determine whether a power (or activation) button is functional and how long it would take for mobile device 110 to be reactivated. Also, program data 102 may be executed to evaluate a display and/or a touch screen to determine whether the display is functional to determine whether any portions of the display are not operating correctly to output image data or receive an input, or whether performance of the display is effected by operation of another component on mobile device 110 and/or by contact by a user. In another example, program data 102 may be executed to determine whether a camera or other input devices or sensors are operating correctly. In another example, program data 102 may be executed to determine whether a speaker is operating correctly to output audio content and/or a microphone is operating correctly to capture audio content. In yet another example, program data 102 may be executed to determine whether a port or memory device included in mobile device 110 is operating correctly.

Furthermore, program data 102 may be executed to determine whether mobile device 110 is operating correctly to exchange various different types of communications (e.g., Bluetooth®, Wi-Fi®, and/or NFC) with another device (e.g., access point 122). For example, program data 102, when executed, may cause mobile device 110 to attempt to automatically activate (e.g., without user input) a transceiver to exchange various data signals (e.g., a Bluetooth® signal and/or a Wi-Fi® signal), and mobile device 110 may determine whether the data signals were successfully exchanged. In another example, program data 102, when executed, may cause mobile device 110 to prompt a user to perform an action, and mobile device 110 may evaluate whether the requested action was accurately performed. For example, mobile device 110 may prompt a user to move mobile device 110 in various directions to test a gyroscope or other motion sensor included in mobile device 110.

Continuing with FIG. 5, process 500 may further include determining a value of mobile device 110 in view of any identified technical issues (block 550) and reporting the technical program and/or adjusted value (block 560). For example, mobile device 110 may access a list of device values and identify a value for a device that is similar to or otherwise corresponds to mobile device 110. For example, a value may be determined based on an age and model associated with mobile device 110. The value may be adjusted based on the condition of mobile device 110, for example, to reflect an expected cost to repair mobile device 110 or resolve any identified technical issue. For example, executing program data 102 may cause mobile device 110 to access a list of repair costs for addressing various types of technical issues, and mobile device 110 may identify particular costs for repairing mobile device 110.

Figure 6:
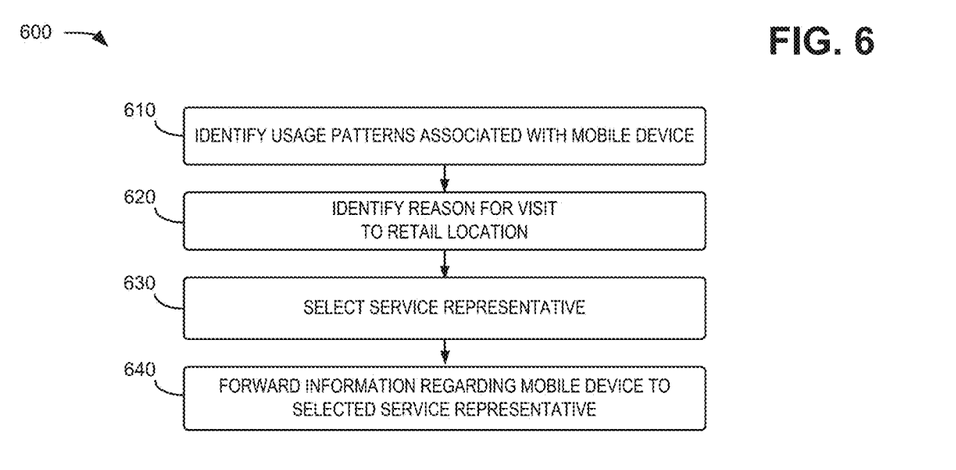
FIG. 6 is a flowchart of a process for executing program data to provide customer service and support in the environment of FIG. 1.

Although program data 102 are described above in the context of evaluating features and components of mobile device 110, it should be appreciated that execution of program data 102 may relate to performing other functions. For example, FIG. 6 shows a flowchart of a process 600 for executing program data 102 related to providing support service to a user of mobile device 110 when a user enters a retail location. In some implementations, process 600 may be performed by mobile device 110. In other implementations, some or all of process 600 may be performed by another device or a group of devices (e.g., other devices that are not shown in FIG. 1) separate from and/or including mobile device 110.

As shown in FIG. 6, process 600 may include identifying usage patterns related to mobile device 110 (block 610). For example, usage of mobile device 110 may be monitored and stored by mobile device 110. Additionally or alternatively, when mobile device 110 approaches the retail location (e.g., when mobile device 110 detects local network message 101 carrying an SSID of a local network 120 associated retail location), mobile device 110 may execute a portion of program data 102 related to obtaining account records from a service provider, and mobile device 110 may identify the usage patterns based on the account records. For example, the usage patterns may include identifying types of application being used on mobile device 110, usage data of components on mobile device 110, amounts and types of data being accessed via mobile device 110, etc.

Continuing with FIG. 6, process 600 may include identifying a reasons for a visit to a retail location (block 620) and selecting a service representative (block 630). For example, mobile device 110 may determine if it has any technical issues (e.g., based execution of a technical evaluation as described in process 500). Additionally or alternatively, mobile device 110, when executing program data 102, may provide a user interface to receive an input identifying a reason for the user's visit to the retail location. Mobile device 110, when entering the retail location and attaching to local network 120, may receive information identify available representatives who are not servicing other users, and if there is no available service representative, mobile device 110 may execute selection logic encoded in program data 102 to identify a representative (block 630). For example, mobile device 110 may select a likely next available service representative (e.g., a service representative who has been helping another customer for a longest duration of time). In another example, mobile device 110 may select a service representative based on the usage pattern and/or the identified reasons for the visit. For example, mobile device 110 may identify a customer service representative who is knowledgeable in a service requested by the user, an identified technical issue, and/or an application frequently accessed by the user.

Mobile device 110 may further forward information regarding mobile device 110 (block 640). For example, mobile device 110 may execute a portion of program data 102 to identify a computing or communications device associated with the selected service representative. Mobile device 110 may forward data associated with the user's usage pattern, the technical evaluation of mobile device 110, and/or the reason for the visit to the identified device associated with the service representative. In this way, the service representative may receive information regarding mobile device 110 when mobile device 110 enters the retail location and before the mobile device reaches the service representative.

Figure 7:
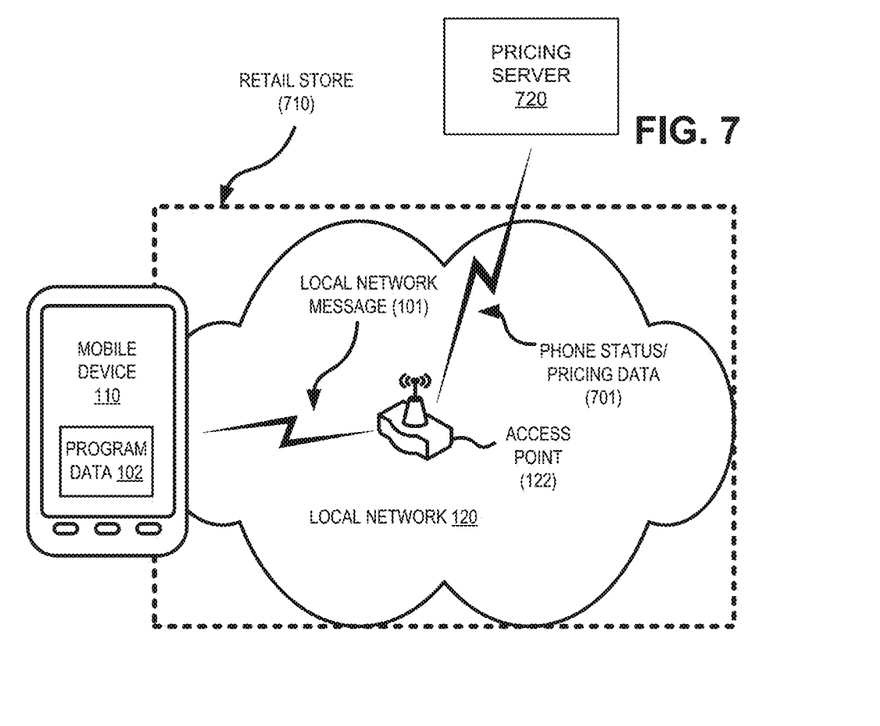
FIG. 7 shows an exemplary implementation of the systems/methods described herein.

FIG. 7 shows an exemplary implementation of the systems/methods described herein. In this example, mobile device 110, when entering a retail store 710, may be in range of a local network 120 associated with an access point 122, and mobile device 110 may detect a local network message 101 from access point 122. Mobile device 110 may evaluate local network message 101 to determine whether local network message 101 is associated with a particular characteristic, such as an SSID having a particular value and/or mathematical characteristic. If local network message 101 is associated with the particular characteristic, mobile device 110 may implement program data 102. For example, program data 102 may evaluate various hardware and/or software included in mobile device 110, and program data 102 may generate a status report regarding mobile device 110. For example, program data may determine whether performance of a component (e.g., a display, a memory, communications interface, speaker, etc.) is functional and whether any degradation of the component is detected. In certain instance, if performance of a component is sufficient degraded (e.g., more than 10% diminished), program data 110 may consider the component to be non-functional.

Program data 102 may further forward, via access point 122, the status report to a pricing server 720 as phone status/pricing data 701. Access point 122 may further forward other information related to retail store 710, such as local inventory and sale data. Pricing server 720 may determine a value of mobile device 110 based on the status report and, optionally, the sales/inventory data. For example, pricing server 720 may determine a trade-in value for an optimal device (e.g., a device without technical issues) similar to mobile device 110 based on local inventory and sale data, and may discount the trade-in value based on any hardware/software issues mobile device 110 that are identified by program data 102 (e.g., listed in phone status/pricing data 701). For example, pricing server 720 may identify expected repair costs for the identified technical issues and may reduce the trade-in value based on the expected repair costs. In another example, if a component is degraded, pricing server 720 may estimate a value of the component of the component and may discount the trade-in value by the amount of degradation of the component. Pricing server 720 may forward, as phone status/pricing data 701, the trade-in value for mobile device 110 to a computing device associated with a customer service representative.

Although FIG. 7 discusses an example of a retail store 710, it should be appreciated that access point 122 may be associated with any type of location (e.g., a repair facility). In another example, a location associated with mobile device 110, and an adjacent access point 122 may be identified. Program data 102 may be programmed to execute based on detection of local network message 101 associated with the local access point 122. For example, if a user is at home, an SSID associated with the user may be identified. For example, if the user is communicating with a remote service technician, the service technician may identify an SSID associated with a network most recently accessed by mobile device 110. Instructions may be forwarded to program data 102 to execute based on detecting the SSID associated with the user. In this way, program data 102 may be selectively activated at any desired location and not just retail store 710.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 4-7, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    storing, by a processor associated with a mobile device, program data, wherein the program data relates to a plurality of tests for evaluating a status of the mobile device;
    identifying, by the processor, a geographic location associated with execution of the program data, wherein a network is associated with the geographic location;
    determining, by the processor, a desired identifier associated with the network;
    detecting, by the processor, a local network message;
    determining, by the processor, an identifier associated with the local network message;
    executing, by the processor and when the determined identifier associated with the detected local network message corresponds to the desired identifier associated with the network, a portion of the program data associated with one or more tests, of the plurality of tests, to produce program results, wherein the program results identify technical issues associated with the status of the mobile device; and
    causing, by the processor, the program results to be presented for display.

2. The method of claim 1, wherein the network includes a Wi-Fi network, and wherein the desired identifier includes a service set identifier (SSID) associated with the Wi-Fi network.

3. The method of claim 1, wherein executing the portion of the program data includes:
    determining a device profile associated with the mobile device;
    selecting, based on the device profile, the one or more tests; and
    performing the one or more tests to determine the status of the mobile device.

4. The method of claim 1, wherein the status of the mobile device relates to diagnosing a fault in a component included in the mobile device.

5. The method of claim 1, wherein the method further includes:

identifying a value associated with the mobile device; and
modifying the value associated with the mobile device based on the status of the mobile device.

6. The method of claim 1, wherein the method further includes:
    selecting a customer service representative based on the status of the mobile device; and
    presenting for display on the mobile device, information identifying the selected customer service representative.

7. The method of claim 6, wherein the method further includes:
    identifying a device associated with the selected customer service representative; and
    forwarding, to the identified device, information identifying the status of the mobile device.

8. A device comprising:
    a memory configured to store instructions; and
    a processor configured to execute one or more of the instructions to:
        store program data to the memory, wherein the program data relates to a plurality of tests for evaluating a status of the device, and wherein the program data identifies a geographic location,
        identify a network associated with the geographic location, wherein a first identifier is associated with the network,
        detect a signal,
        determine a second identifier associated with the signal,
        execute, when the second identifier of the signal matches the first identifier associated with the network, a portion of the program data associated with one or more tests, of the plurality of tests, to produce program results, wherein the program results identify technical issues associated with the device, and
        cause the program results to be presented for display.

9. The device of claim 8, wherein the network includes a Wi-Fi network, and wherein the first identifier includes a service set identifier (SSID) associated with the Wi-Fi network.

10. The device of claim 8, wherein the network includes a short range wireless network, and wherein the first identifier includes a device type identified in a connection request associated with the short range wireless network.

11. The device of claim 8, wherein the plurality of tests include a plurality of first tests for evaluating a plurality of components, and wherein the processor, when executing the portion of the program data, is further configured to:
    identify one or more components of the plurality of components included in the device;
    select the one or more tests, wherein the one or more tests relate to evaluating the one or more components included in the device; and
    perform the one or more tests to determine the status of the device.

12. The device of claim 8, wherein the processor is further configured to execute one or more of the instructions to:
    select a customer service representative based on the status of the device; and
    present, for display, information identifying the selected customer service representative.

13. The device of claim 12, wherein the processor, when selecting the customer service representative, is further configured to:
    determine a usage pattern associated with the device before detecting the signal, and select the customer service representative further based on the usage pattern.

14. The device of claim 8, wherein the processor is further configured to execute one or more of the instructions to:
determine a signal strength of the signal;
calculate a distance between the device and an access point transmitting the signal based on the signal strength; and
determine, based on the signal strength and a location of the access point, whether the device is positioned at the geographic location.

15. A non-transitory computer-readable medium configured to store instructions, the instructions comprising:
one or more instructions that, when executed by a processor associated with a device, cause the processor to:
receive program data, wherein the program data relates to a plurality of tests for evaluating a status of the device, and wherein the program data identifies a first identifier associated with a network,
detect a signal,
determine a second identifier associated with the signal,
execute, when the second identifier of the signal corresponds to the first identifier associated with the network, a portion of the program data associated with one or more tests, of the plurality of tests, to produce program results, wherein the program results identify technical issues associated with the device, and
cause the program results to be presented for display.

16. The non-transitory computer-readable medium of claim 15, wherein the network includes a wireless network, and wherein the first identifier includes a service set identifier (SSID) associated with the wireless network.

17. The non-transitory computer-readable medium of claim 15, wherein the signal is sent from an access point, and wherein the one or more instructions further cause the processor to:
determine a signal strength of the detected signal;
determine, based on the signal strength, a distance between the device and the access point; and
execute the program data further based on determining that the signal strength satisfies a threshold level.

18. The non-transitory computer-readable medium of claim 15, wherein the signal is sent from an access point, and wherein the one or more instructions further cause the processor to:
measure a first signal strength of the signal during a first time period;
measure a second signal strength of the signal during a second time period;
determine a difference between the first signal strength and the second signal strength;
determine, based on the difference between the first signal strength and the second signal strength, whether the device is moving toward the access point; and
execute the program data further based on determining that the device is moving toward the access point.

19. The non-transitory computer-readable medium of claim 15, wherein the one or more instructions further cause the processor to:
receive the program data via the signal during a first time period, wherein the processor determines the second identifier associated with the signal during a second time period that is after the first time period.

20. The non-transitory computer-readable medium of claim 15, wherein the one or more instructions that cause the processor to execute the program data include one or more instructions that cause the processor to perform the one or more tests on the device, wherein the one or more tests includes:
a first test determine whether a power button in the device is functional,
a second test to determine whether a display in the device is functional;
a third test to determine whether a camera in the device is functional;
a fourth test to determine whether a speaker in the device is functional;
a fifth test to determine whether a port in the device is functional; and
a sixth test to determine whether a network interface in the device is functional.

* * * * *